United States Patent Office 2,917,362
Patented Dec. 15, 1959

2,917,362
METHOD OF OXIDIZING PLUTONIUM ION WITH BISMUTHATE ION

Clifford S. Garner, Los Angeles, Calif., assignor to the United States of America as represented by the United States Atomic Energy Commission No Drawing. Application September 30, 1947
Serial No. 777,129

10 Claims. (Cl. 23—14.5)

This invention relates to the separation of plutonium from elements commonly found with it and more particularly it is concerned with an improvement in the oxidation-reduction method of separating plutonium from other elements.

Plutonium is ordinarily obtained by irradiating uranium with neutrons. This irradiation of uranium with neutrons not only causes formation of plutonium but also of neptunium and radioactive fission products. These fission products include the elements in the periodic table between atomic numbers 32 and 63. The plutonium, neptunium and fission products produced by neutron irradiation are usually in a very small ratio to the total volume of uranium mass, often of the order of one part of combined plutonium and other products of uranium irradiation to 4000 parts unreacted uranium. The products of neutron irradiation of uranium are very useful when they are separated from the mass of unreacted uranium. The fission products are widely used as tracers in various fields of research, particularly the medical and chemical fields. The uranium which is only partially depleted in $U^{235}$ may be reused again in a neutronic reactor for the production of power.

Plutonium exists in at least four states of valence and compounds formed by plutonium in these various valence states differ widely in their solubility characteristics. In aqueous solution the normal valence state of plutonium is $+4$, but under proper conditions the stable $+3$ and $+6$ plutonium states may also be formed. Plutonium also exists in the $+5$ oxidation state but this state is quite unstable in aqueous solution. Tetravalent plutonium forms a number of relatively insoluble compounds including among others the fluoride, iodide, orthophosphate and peroxide. By comparison to Pu(IV), Pu(VI) forms very few insoluble compounds. These include $NaPuO_2Ac_3$ and various "diplutonates" (postulated to be $BaPu_2O_7$, $CaPu_2O_7$, $K_2Pu_2O_7$, etc.) which form in basic solutions. The phosphate, fluoride, arsenate and iodate of plutonium (VI) are all quite soluble.

One of the most successful methods of separating plutonium and fission products, the oxidation-reduction separation method, depends upon the difference between the solubility of analagous Pu(IV) and Pu(VI) compounds. The best known of this type of oxidation-reduction separation method is the bismuth phosphate-lanthanum fluoride process. In this process the neutron reacted uranium is permitted to age from 30 to 90 days in order that the neptunium present in the uranium mass will decay to plutonium. The uranium mass is then dissolved in nitric acid to form a uranyl nitrate hexahydrate solution containing plutonium and fission products. The plutonium in this solution is reduced to the $+4$ valence state while maintaining the uranium in the $+6$ valence state. A plutonium carrier precipitate of bismuth phosphate is then formed in, and separated from, the uranyl nitrate hexahydrate solution. The bismuth phosphate carries with it the insoluble plutonium phosphate, $Pu_3(PO_4)_4$ as well as certain of the fission products, particularly zirconium and columbium, which form insoluble phosphates. This step is usually referred to as the extraction step. A decontamination cycle follows, whereby the plutonium is separated from the fission products which were carried with the product carrier precipitate in the extraction cycle. In the decontamination cycle plutonium is oxidized to the hexavalent state, and a bismuth phosphate precipitate formed in, and separated from, the solution containing the plutonium and fission products. Since the $Pu^{+6}$ does not form an insoluble phosphate it will remain in solution during this "by-product" precipitation but the phosphate insoluble fission products will be carried with the precipitate. The plutonium is then reduced to the tetravalent state and separated from the solution by forming a bismuth phosphate carrier precipitate in the solution and separating it therefrom. This "product" precipitate which contains plutonium is then dissolved in nitric acid, and the plutonium oxidized to the hexavalent state to complete the cycle. Plutonium is then concentrated in the following cycle: the bismuth phosphate present in the solution is substantially removed by precipitation, the plutonium then reduced to the tetravalent state and a lanthanum fluoride plutonium carrier precipitate formed in, and separated from, the solution. The lanthanum fluoride plutonium carrier is then dissolved in nitric acid and metathesized with an alkali metal carbonate or hydroxide to form a mixture of plutonium and lanthanum hydroxides. These mixed hydroxides are separated from solution and may be dissolved in a much smaller quantity of nitric acid, thus effecting substantial concentration of the plutonium. The plutonium is then oxidized to the hexavalent state and the lanthanum separated from the solution by precipitating it as the fluoride. The plutonium is then reduced to the tetravalent state and separated by precipitating without a carrier as the peroxide. There are several alternate procedures involving the use of the carriers other than lanthanum fluoride and bismuth phosphate and involving minor variations in the described process. The process in general, however, follows the outline above.

The success of the oxidation-reduction separation process depends to a great extent upon the efficiency of the plutonium oxidation step. Several steps in this process are dependent upon the oxidation of plutonium from the $+4$ to the $+6$ valence state and because of the small percentage of plutonium involved it is essential that the utmost efficiency in these oxidation steps be maintained. A great deal of research has been done on the problem of oxidation of plutonium and numerous oxidizing agents have been tried in an effort to find the one offering the greatest advantages. The oxidation-reduction potentials of the various plutonium couples have been determined and voltages for these couples are:

In 1 M $HClO_4$ solutions: Pu(III) $(-0.945)$ Pu(IV) $(-1.067)$ Pu(VI)

$\uparrow$ _____ $(-1.027)$ _____ $\uparrow$

In 1 M HCl solutions: Pu(III) $(-0.966)$ Pu(IV) $(-1.047)$ Pu(VI)

$\uparrow$ _____ $(-1.020)$ _____ $\uparrow$

In 1 M $HNO_3$ solutions: Pu(III) $(-0.92)$ Pu(IV) $(-1.11)$ Pu(VI)

$\uparrow$ _____ $(-1.04)$ _____ $\uparrow$

From the above diagram it will be evident that an oxidizing agent which has a potential more negative than about −1.04 volts may theoretically be useful in the oxidation of plutonium. Certain difficulties have been encountered, however, in the use of the common oxidizing agents such as dichromate and permanganate ions. For example, when the oxidation of plutonium is carried out by means of potassium dichromate in stainless steel equipment, the high temperature necessary for the oxidation presents a series corrosion problem. Permanganate also requires a higher temperature to carry out the oxidation of $Pu^{+4}$ to $Pu^{+6}$. Another difficulty which has been encountered in the use of common oxidizing agents is the introduction of ions into the solution which are difficult to separate from the plutonium. This is particularly true when oxidation is carried out with potassium dichromate and ceric ion, since both the cerous and the chromic ion are difficult to separate from the oxidized plutonium ions.

An object of this invention is to provide a method for oxidizing plutonium from a lower to a higher valence state.

An additional object of this invention is to provide a method for oxidizing plutonium from a lower to a higher valence state in which the products produced by the oxidation may be easily separated from the oxidized plutonium ions.

Additional objects and advantages of the present invention will be evident from the following description.

The present invention comprises the oxidation of plutonium ions contained in acidic aqueous solution, from a lower to a higher valence state by contacting the plutonium ions with bismuthate ion. The bismuthate ion may be introduced into the solution as an alkali metal bismuthate, such as sodium and potassium bismuthate, since these bismuthates when added to water or acid hydrolyze to bismuthic acid which is a very powerful oxidizing agent. The reaction and voltage are shown by the following equation:

$$BiO^+ + 2H_2O = HBiO_3 + 3H^+ + 2e^- \quad E_0 = ca. -1.6$$

The potential of this oxidizing agent is sufficiently negative that it will readily oxidize plutonium from any lower to any higher valence state; thus it may be used to oxidize plutonium from the $+3$ to the $+4$ state, the $+3$ to the $+6$ state or from the $+4$ to the $+6$ state. The oxidation may be carried out at room temperature, although it is preferably carried out at a higher temperature. The plutonium in the bismuth phosphate separation process is normally oxidized from the tetravalent to the hexavalent states, and since the hexavalent state is the highest oxidation state and plutonium is not stable in acid solution in the intermediate pentavalent state, this oxidation may be carried out by the process of this invention without concern over critical quantities of bismuthate ion. However, should it be desired to oxidize the plutonium from the trivalent to the tetravalent state, it will be desirable to maintain the conditions under which the oxidation is carried out so that the speed of reaction will be slower and there will not be an excess of oxidizing agent. Complexing agents may also be suitably employed to insure that the plutonium will not be oxidized beyond the tetravalent state. For example, the fluoride, phosphate and oxalate ions strongly complex the plutonium ion in the tetravalent state and thus if one or more of these ions is present in a solution in which plutonium is oxidized from the trivalent to the tetravalent state, these ions will tend to prevent further oxidation of the plutonium to the hexavalent state.

Sodium bismuthate is comparatively insoluble in aqueous solution so that any excess bismuthate over that required for oxidation of plutonium may be readily removed from solution by filtration. The product of the reaction, $Bi^{+3}$, may easily be removed from solution by precipitation with phosphate ion. Plutonium in the hexavalent states does not form an insoluble phosphate so will not be carried from solution with a bismuth phosphate precipitate. Thus, where sodium bismuthate is used as the oxidizing agent, plutonium may be readily separated following the oxidation reaction from the excess oxidizing agent and reduction products. The oxidation of plutonium by the process of this invention may be carried out at room temperatures and is normally carried out at temperatures not greatly above 50° C. and at these temperatures sodium bismuthate does not cause appreciable corrosion on stainless steel equipment, thus making it possible to carry on the oxidation reaction in stainless steel equipment. Sodium bismuthate is quite stable at room temperatures. It has been found that in aqueous slurry only 15% loss of oxidizing power occurs in 90 hours at 25° C.

The stoichiometric quantities of bismuthate required to oxidize plutonium from one valence state to another may be calculated from the equations given below:

$$Pu^{+3} = Pu^{+4} + e^- \quad E_0 = -0.92$$
$$Pu^{+4} = Pu^{+6} + 2e^- \quad E_0 = -1.11$$
$$Pu^{+3} = Pu^{+6} + 3e^- \quad E_0 = -1.04$$
$$BiO^+ + 2H_2O = HBiO_3 + 3H^+ + 2e^- \quad E_0 = ca. -1.6$$

Although the oxidation of plutonium ions is possible with stoichiometric quantities of bismuthate, it has been found advisable to use at least double the stoichiometric amount of bismuthate to plutonium to secure a faster rate of oxidation when the final product desired is the hexavalent plutonium. The various limiting factors in the oxidation of plutonium by bismuthate ion, such as the concentration of the bismuthate ion, the acidity of the solution in which the reaction is carried out, the time and the temperature, are mutually interdependent and by correlated adjustment of these variables, oxidation may be obtained over a wide range of conditions. The preferred method of oxidizing tetravalent plutonium to hexavalent plutonium is to introduce at least double the stoichiometric amount of the bismuthate as a slurry into an aqueous acidic solution containing the plutonium ions in which the acidity is from 4 to 6 N and digesting the reaction mixture for 20 to 40 minutes at about 50° C. The oxidation of the plutonium by this method is substantially quantitative with better than 98% of the plutonium oxidized within 15 minutes of the time the reaction commences. Since the sodium bismuthate is insoluble in aqueous solution, it is usually added to the solution as a slurry. Slurry concentrations of 10 to 15% are entirely satisfactory. Any excess of sodium bismuthate over that required for oxidation will remain in solution as a suspended solid and may be easily removed by filtration.

Since plutonium forms precipitates in basic aqueous solution, it is desirable that the oxidation be carried on in acidic solution. A high acid concentration in solution, however, tends to stabilize the $Pu^{+4}$ ion, although the $Pu^{+4}$ is capable of disproportionating to the $Pu^{+3}$ and the $PuO_2^{+2}$ in dilute acid solution. A high acid concentration will also cause bismuthate to decompose quite rapidly and because of this it is advisable to maintain a moderate acid concentration in solution in which the oxidation reaction is to be carried out. For moderate concentration, it has been found that an acidity of approximately 5 N is the preferred concentration, since it results in rapid oxidation without unduly rapid decomposition of the bismuthate ion. The oxidation has been carried out successfully in nitric acid concentrations ranging from 1 to 10 N and should it be desired to carry out an oxidation at any acid concentration within this range it may be done by adjusting other interdependent factors in the process.

Although stoichiometric quantities of bismuthate will oxidize a stoichiometric quantity of plutonium, it has been found desirable to use a sufficient concentration of sodium bismuthate to take care of any decomposition losses caused by other factors, such as the reduction of bismuthate by stainless steel surfaces when the reaction is carried on in steel containers. The presence of an excess of bismuthate is not at all critical in the oxidation of tetravalent to hexavalent plutonium, since any excess bismuthate may be easily removed from the solution by filtration and the plutonium may not be oxidized to a higher oxidation than the hexavalent state. In the bismuth phosphate process where the plutonium is normally present in about $10^{-5}$ concentration, it has been found desirable to use sodium bismuthate as an oxidizing agent in about 0.01 M concentration to insure a reasonable margin of safety.

The potential of sodium bismuthate as an oxidizing agent is sufficiently negative that it will oxidize plutonium at room temperature. In most cases it is desirable to digest the oxidation solution at a higher temperature since by this means the speed of reaction is greatly increased. However, any increase in the temperature of the reaction medium causes a decrease in the stability in the sodium bismuthate so although it is possible to carry out the reaction in the range between 25 and 95° C., it has been found that the reaction may most effectively be carried out in a range of 40–60° C. The time of the reaction will depend upon the other factors such as concentrations, acidity of the reaction mixture and temperature at which the reaction is carried out. It has been found that under optimum conditions oxidation proceeds very rapidly so that it is usually substantially complete within 20–25 minutes. Tests have shown that the tetravalent plutonium has no tendency to revert to the reduced form after two hours holdup in 4 N nitric acid at 50° C. in 18–8 stainless steel containers, although sodium bismuthate is 95% decomposed by reaction with water in 30 minutes under these conditions. If the oxidized plutonium is to be maintained in solution for longer than two hours, however, it is believed advisable to introduce a holding oxidant, such as dichromate or permanganate ion. The use of a holding oxidant may be also advantageous when the reaction is carried out in stainless steel equipment to prevent local reduction by the stainless steel surfaces due to the relatively low stability of the sodium bismuthate.

The effect of variations in the acid concentration, sodium bismuthate concentration, reaction time, and reaction temperature may be illustrated by Tables I to IV. The procedure used in obtaining the results shown in these tables was to add plutonium tracer and water to 1 cc. of a solution of bismuth phosphate in 10 N nitric acid containing 25 mg. $Bi^{+3}$ per cc. This solution was heated to the desired temperature on a constant temperature bath and the sodium bismuthate then added as a slurry in water, with correct amounts of sodium bismuthate and water to give the desired final concentration. This mixture was stirred constantly for the time indicated in Tables I to IV. The tubes were then removed from the thermostat and water and $H_3PO_4$ were added to give a nitric acid concentration of 1 N and $H_3PO_4$ concentration of 0.1 M. The phosphate precipitate, thus formed, was allowed to stand with occasional stirring for one-half hour at room temperature and separated by centrifugation. Both the precipitate and supernatant solution were then analyzed for plutonium by the radiometric method. The containers in which the reactions were carried on varied from experiment to experiment so that these tables do not necessarily indicate the optimum conditions for oxidation of plutonium with bismuthate ion, but only the effect of changing the variable in the particular table shown.

TABLE I

*Effect of $HNO_3$ concentration on percent of plutonium oxidized*

[Conditions: 0.05 M $NaBiO_3$ 15 min. at 50° C. Pu tracer.]

| $HNO_3$ normality | 2 | 3 | 4 | 5 | 6 |
|---|---|---|---|---|---|
| Percent Pu (IV) oxidized | 39 | 71 | 80 | 80 | 82 |

TABLE II

*Effect of $NaBiO_3$ concentration on the percent of plutonium oxidized*

[Conditions: 4 N $HNO_3$ 15 min. at 50° C. Pu tracer.]

| $NaBiO_3$ molarity | .001 | .003 | .005 | .008 | .010 |
|---|---|---|---|---|---|
| Percent Pu (IV) oxidized | 40 | 61 | 80 | 92 | 85 |

TABLE III

*Effect of time on the percent of plutonium oxidized*

[Conditions: 4 N $HNO_3$, 0.005 M $NaBiO_3$ 50° C. Pu tracer.]

| Time (min.) | 5 | 13 | 27 | 57 | 120 |
|---|---|---|---|---|---|
| Percent Pu (IV) oxidized | 34 | 83 | 87 | 95 | 84 |

TABLE V

*Effect of temperature on the percent of plutonium oxidized*

[Conditions: 4 N $HNO_3$ 0.005 M $NaBiO_3$ 15 min. Pu tracer.]

| Temperature, °C | 30 | 40 | 50 | 75 |
|---|---|---|---|---|
| Percent Pu (IV) oxidized | 40 | 87 | 97 | 93 |

The oxidation of plutonium from a lower to a higher valence state may be further illustrated by the following example.

EXAMPLE I

About 50 micrograms of sodium bismuthate was added to 10 micrograms of perchloric acid solution containing tetravalent plutonium in tracer quantity. The reaction solution was digested for 25 minutes at 50° C. The excess sodium bismuthate was then separated by centrifugation and a bismuth phosphate precipitate formed in, and separated from, the solution. The plutonium remaining in the solution was then reduced with ferrous ion and separated from the solution with a lanthanum fluoride carrier precipitate. The resultant lanthanum fluoride precipitate was analyzed for plutonium by radiometric methods, and it was determined that 98.4% of the plutonium was contained in the lanthanum fluoride precipitate.

The process of this invention may be used in any step of the bismuth phosphate-lanthanum fluoride oxidation-reduction process of plutonium separation in which it is desired to oxidize plutonium from a lower to a higher valence state. It may be used in separation processes based on other carriers such as uranyl acetate or thorium iodate and it may be used in any other process where it is desired to oxidize plutonium from a lower to a higher valence state.

In general, it may be said that any equivalents or modifications or procedure which would naturally occur to those skilled in the art are included in the scope of the present invention.

What is claimed is:

1. The process of oxidizing plutonium from a lower to a higher valence state, which comprises subjecting said plutonium contained in an acidic solution to the action of bismuthate ion.

2. The process of claim 1 wherein phosphate ion is added to the reaction mixture and the resulting bismuth-containing precipitate is separated from the supernatant liquor.

3. The process of oxidizing plutonium from a lower to a higher valence state, which comprises treating said plutonium contained in an acidic solution with an alkali metal bismuthate.

4. The process of claim 3 wherein sufficient alkali metal bismuthate is added to form a slurry and after the reaction between the plutonium and said bismuthate has proceeded to the extent desired the solids of said slurry are separated from the liquid.

5. The process of claim 4 wherein phosphate ion is added to the liquid and the resulting bismuth-containing precipitate is separated from the supernatant liquor.

6. The method of oxidizing plutonium from the tetravalent to the hexavalent state, which comprises treating tetravalent plutonium contained in an acidic solution with sodium bismuthate.

7. The process of oxidizing plutonium from the trivalent to the hexavalent state, which comprises treating trivalent plutonium contained in an aqueous acidic solution with sodium bismuthate.

8. The method of oxidizing plutonium from the tetravalent to the hexavalent state, which comprises treating tetravalent plutonium contained in an acidic aqueous solution having a nitric acid concentration of between 1 and 10 N, with sodium bismuthate in greater than stoichiometric quantity and digesting the reaction mixture at a temperature between 20 and 95° C.

9. The method of oxidizing plutonium from a lower to a higher valence state, which comprises treating said plutonium in its lower oxidation state contained in an acidic solution having a nitric acid concentration of between 4 and 6 N, with sodium bismuthate and digesting the solution between 40 and 60° C., until oxidation of the plutonium is substantially complete.

10. The method of oxidizing plutonium from the tetravalent to the hexavalent state, which comprises treating plutonium contained in an acid solution having a nitric acid concentration of between 4 and 6 N, with sodium bismuthate and digesting the solution between 40 and 60° C., until oxidation of the plutonium is substantially complete.

References Cited in the file of this patent

UNITED STATES PATENTS 2,785,951     Thompson et al. _____ Mar. 19, 1957

OTHER REFERENCES

Kitashima: "Chemical Abstracts," vol. 23, page 1074 (1929).

Martin-Frere: "Comptes Rendus," vol. 213, pp. 436, 437 (1941).

Handbook of Chemistry and Physics, 27th ed., page 1346 (1943). Publ. by the Chemical Rubber Publ. Co., Cleveland, Ohio.

Harvey et al.: "Journal of the Chemical Society," August 1947, pages 1010–1021.

Seaborg et al.: "Journal of the American Chemical Society," vol. 70, pages 1128–1134 (1948), particularly page 1133.

Seaborg et al.: "The Transuranium Elements," part I, pages 368–9 (1949). Publ. by McGraw-Hill Book Co., N.Y.